United States Patent [19]

Serini et al.

[11] 4,338,429

[45] Jul. 6, 1982

[54] PROCESS FOR WORKING UP POLYCARBONATES

[75] Inventors: Volker Serini, Krefeld; John Goossens, Cologne; Ludwig Bottenbruch, Krefeld; Dieter Freitag, Krefeld, all of Fed. Rep. of Germany

[73] Assignee: Bayer Aktiengesellschaft, Leverkusen, Fed. Rep. of Germany

[21] Appl. No.: 166,015

[22] Filed: Jul. 7, 1980

[30] Foreign Application Priority Data

Jul. 13, 1979 [DE] Fed. Rep. of Germany ....... 2928444

[51] Int. Cl.³ ................................................ C08J 3/10
[52] U.S. Cl. .................... 528/196; 528/370; 528/371; 528/372; 528/492; 528/502; 528/198
[58] Field of Search ............... 528/502, 196, 198, 370, 528/371, 372, 492

[56] References Cited

U.S. PATENT DOCUMENTS

| | | | |
|---|---|---|---|
| 3,143,525 | 8/1964 | Ott | 260/47 |
| 3,184,431 | 5/1965 | Deanin et al. | 528/196 |
| 3,275,601 | 9/1966 | Schnell et al. | 260/47 |
| 3,294,741 | 12/1966 | Schnell et al. | 528/196 |
| 3,879,347 | 4/1975 | Serini et al. | 260/47 |
| 3,879,348 | 4/1975 | Serini et al. | 260/47 |

FOREIGN PATENT DOCUMENTS

| | | |
|---|---|---|
| A555894 | 4/1957 | Belgium . |
| 1645054 | 7/1970 | Fed. Rep. of Germany . |
| 2901665 | 7/1980 | Fed. Rep. of Germany . |
| 2901668 | 7/1980 | Fed. Rep. of Germany . |
| 51-112897 | 3/1976 | Japan . |
| 53-3748 | 1/1978 | Japan . |
| 963322 | 11/1962 | United Kingdom . |

OTHER PUBLICATIONS

Methoden der Organischen Chemie, (Houben–Weyl), vol. I/1, 1958, pp. 218-221.

*Primary Examiner*—V. P. Hoke
*Attorney, Agent, or Firm*—Gene Harsh; Lawrence S. Pope; Aron Preis

[57] ABSTRACT

The present invention relates to a process for working up alkaline two-phase mixtures which have been obtained in the synthesis of polycarbonates by the two-phase boundary process, characterized in that for the separation of the alkaline two-phase mixture into an organic phase and an aqueous phase, the mixture is supplied with shearing energy and/or added are one or more cationic emulsifying agents and/or dispersing agents and/or in that, for the separation of the acidified two-phase mixture into an organic phase and an aqueous phase, the mixture is supplied with shearing energy and/or added are one or more cationic emulsifying agents and/or dispersing agents and/or in that the organic phase which was separated off after the acidification is washed with water to which one or more water-soluble, organic anionic compounds have been added.

8 Claims, No Drawings

PROCESS FOR WORKING UP POLYCARBONATES

BACKGROUND OF THE INVENTION

The synthesis of high molecular, thermoplastic polycarbonates by the two-phase boundary process is described, for example, in H. Schnell, "Chemistry and Physics of Polycarbonates", New York-London-Sidney, Interscience Publishers, 1964, "Polymer Reviews," Volume 9, in U.S. Pat. No. 3,275,601, in German Offenlegungsschriften (German Published Specifications) Nos. 2,063,050 and 2,211,957 and in German patent applications P 29 01 668.0 (LeA 19,146) and P 29 01 665.7 (LeA 19,040).

In that synthesis, when the polycondensation reaction has ended, the two-phase mixtures which consist of an organic phase and an aqueous alkaline phase are obtained. The organic phase in general consists of one or more organic solvents, which contain the dissolved polycarbonate. The aqueous alkaline phase in general consists of a solution of alkali metal hydroxide and salts which are formed during the condensation reaction. If NaOH is used as the alkali metal hydroxide, NaCl and $Na_2CO_3$, for example, formed during the condensation reaction, are present in the aqueous phase. In addition to the substances mentioned, catalysts such as, for example, tertiary amines or quaternary ammonium, arsonium and phosphonium compounds are, in general, present in one or both phases.

As is known, separation and purification of the resulting organic solutions in a prerequisite for isolating the synthesized polycarbonate.

The alkali metal hydroxide, the catalysts and the salts can be separated off from the organic solution of polycarbonate as follows:

1. Separation of the alkaline two-phase mixture by settling or centrifugation (discontinuously or continuously). If necessary, the separated off organic phase is mixed with pure dilute alkali metal hydroxide solution and is again separated to remove unreacted bis-phenolate. If necessary, the process is repeated.
2. Mixing of the organic phase with aqueous acid in order to neutralize residual traces of alkali metal hydroxide and, if necessary, to remove residues of catalysts (for example, amines as ammonium salts). Separation is carried out as described under 1. Repetition of the operation, if necessary.
3. Mixing of the organic phase with water in order to remove traces of salt and acid from the organic solution. Separation is carried out as described under 1. Repetition of the operation, if necessary.

The amount of dilute alkali metal hydroxide solution to remove unreacted bis-phenolate from the organic phase, the amount of aqueous acid to neutralize residual traces of alkali metal hydroxide and catalyst in the organic phase and the amount of water to remove traces of salt and acid from the organic phase are selected such that the volume ratio of aqueous phase to organic phase is between 0.01:1 to 5:1, the ratios of between 0.1:1 and 2:1 are preferred.

In general, at least the washing operation described under 3 must be repeated several times in order to obtain sufficiently purified polycarbonate solutions. This is related to the fact that the separation of the alkaline or acid to neutral two-phase mixtures does not take place quantitatively in practice, since even in the case of an efficient separation, the organic phase in general still contains droplets of the aqueous phase. Phase separations in the alkaline acid and neutral ranges in general depend on the raw materials and reaction conditions employed for the polycarbonate synthesis. In many cases, the phase separation is so poor that sufficient purification of the polycarbonate solution is not possible even if great losses of material were acceptable and is, in fact, impossible.

BRIEF DESCRIPTION OF THE INVENTION

Surprisingly, it has now been found that the purification steps of the organic solution of polycarbonate described under 1, 2 and 3 can be greatly improved by following the measures described below. The purification described in steps 1 and 2 can be improved by supplying shearing energy and/or by adding cationic emulsifying agents and dispersing agents and the purification of step 3 can be improved by adding water-soluble, organic, anionic compounds.

These measures give rise to a significantly improved phase separation, which permits a reduced number of washing operations and, in many cases, is the only means by which the purification problem can be overcome at all.

DETAILED DESCRIPTION OF THE INVENTION

Shearing energy can be supplied to the alkaline or acid two-phase mixtures by various units such as high-speed stirrers or pumps. Pumps in association with tubes having alternatively wide and narrow diameters or which contain perforated diaphragms are also applicable.

Cationic emulsifying agents and dispersing agents which are suitable according to the invention are described, for example, in Ullmanns Encyklopädie der technischen Chemie (Ullmanns Encyclopedia of Industrial Chemistry), Volume 10, pages 449–473, Verlag Chemie, Weinheim/Bergstrabe, 1975 and in McCutcheon's monograph: Detergents and Emulsifiers, Oak Park, Illinois, U.S.A.

The cationic emulsifying agents and dispersing agents which are suitable according to the invention include, for example, quaternary alkylammonium salts such as cetyltrimethylammonium chloride, alkylbenzylammonium salts such as methyldodecylbenzyltrimethylammonium chloride, alkylpyridinium salts such as cetylpyridinium chloride, primary, secondary and tertiary fatty amine salts, quaternary amidoamine compounds, alkanolamine salts of esters and ethers, alkylimidazolinium salts, alkyloxazolinium salts, amine oxides and other cationic products and amines, cationic polymers, polyamines, polyamide-amines, polyimines and ampholytes such as, for example, albumin and albumin derivatives. Of the products mentioned, those which contain at least one quaternized N atom are to be preferred. Mixtures of two or more of the above-mentioned substances can also be used.

The cationic emulsifying agents and dispersing agents are, in general, employed in amounts of 10–10,000 ppm relative to the weight of the aqueous phase of the two-phase mixture. Amounts of 100–1,000 ppm relative to the weight of the aqueous phase are, in general, preferred.

Water-soluble, organic anionic compounds which are suitable according to the invention are described, for example, in Ullmanns Encyclopädie der technischen Chemie (Ullmans Encyclopedia of Industrial Chemistry), Volume 10, pages 449–473, Verlag Chemie, Weinheim/Bergstrabe, 1975 and in McCutcheon's monograph: Detergents and Emulsifiers, Oak Park, Ill. U.S.A.

The water-soluble organic anionic compounds which are suitable according to the invention include, for example, alkylsulphonates, alkylsulphates and naphthalenesulphonates and other sulphates and sulphonates as described in McCutcheon's monograph, Detergents and Emulsifiers, 1978. Anionic polymers which contain carboxyl groups or phosphate groups such as, for example, carboxymethylcellulose, polyacrylic acid, polymethacrylic acid and complex organic polyphosphoric acid ester anhydrides are particularly suitable. Preferred compounds are polymers which contain sulphate groups or sulphonate groups such as, for example, polystyrenesulphonate, polyvinylsulphate, lignin sulphonate, cellulose sulphate, polymerized alkylarylsulphonic acid, polymerized benzylalkylsulphonic acids and sulphonated aromatic formaldehyde resins, and alginates. The salts and acids mentioned can be employed either in the form of free acids or in the form of salts. Derivatives of the substances mentioned can also be employed. Mixtures of two or more of the above-mentioned substances can likewise be used.

The water-soluble, anionic, organic compounds are added in amounts of 0.1–1,000 ppm relative to the weight of the aqueous phase. Amounts of 5–100 ppm relative to the weight of the aqueous phase are preferably employed.

It is surprising that measures which usually lead to an impairment or complete prevention of phase separation lead, according to the invention, to improvement in the phase separation. It is also surprising that the amounts of cationic emulsifying agents and dispersing agents and of water-soluble, organic, anionic compounds to be added are exceptionally small.

The advantages of the working up, according to to the invention, of the polycarbonate solutions are obvious; the particular advantages for carrying out the two-phase boundary polycarbonate preparation process industrially consist of a great saving in time, material and costs. Only thus does industrial production of some groups of polycarbonate become economical at all.

The process described can advantageously be applied for working up aromatic-aliphatic polycarbonates and, in particular, aromatic polycarbonates prepared by the phase boundary process. Examples of aliphatic-aromatic polycarbonates are listed in German Offenlegungsschriften (German Published Specifications) Nos. 2,702,626; 2,636,784; 2,651,639 and 2,636,783.

Aromatic polycarbonates are described, for example, in the literature references mentioned at the beginning of this text and in U.S. patent specifications Nos. 3,028,365; 2,999,835; 3,148,172; 2,991,273; 3,271,367 and 2,999,846 and in German Offenlegungsschriften (German Published Specifications) Nos. 2,063,052; 1,570,703; 2,211,956; 2,248,817 and 2,615,038.

The working up, according to the invention, of the polycarbonate solutions can be used particularly successfully when the polycarbonates are prepared by the two-phase boundary process from at least one of the following bis-phenols: 2,2-bis-(4-hydroxyphenyl)-propane; bis-(4-hydroxyphenyl)-sulphide; 1,1-bis-(4-hydroxyphenyl)-cyclohexane; α,α'-bis-(4-hydroxyphenyl)-p-diisopropylbenzene; 2,2-bis-(3-methyl-4-hydroxyphenyl)-propane; 2,2-bis-(3,5-dichloro-4-hydroxyphenyl)-propane; 2,2-bis-(3,5-dibromo-4-hydroxyphenyl)-propane; bis-(3,5-dimethyl-4-hydroxyphenyl)-methane; 2,2-bis-(3,5-dimethyl-4-hydroxyphenyl)-propane; α,α'-bis-(3,5-dimethyl-4-hydroxyphenyl)-p-diisopropylbenzene and 1,1,3,4,6-pentamethyl-3-(3,5-dimethyl-4-hydroxyphenyl)-inden-5-ol.

The working up according to the invention is particularly suitable in the preparation of polycarbonates which contain at least 50% by weight, preferably at least 85% by weight, of units derived from 2,2-bis-(4-hydroxyphenyl)-propane or 2,2-bis-(3,5-dimethyl-4-hydroxyphenyl)-propane.

The working up according to the invention is especially suitable in the preparation of polycarbonates which contain at least 50% by weight, preferably at least 85% by weight, of units derived from 2,2-bis-(3,5-dimethyl-4-hydroxyphenyl)-propane.

The working up according to the invention of the polycarbonate solutions can also be applied particularly well in the polycarbonate preparation according to German Patent Applications P 29 28 464.8 (LeA 19,525) and No. P 2928443.3 (LeA 19,623), filed at the same time, in each of which different bis-phenol mixtures are used as starting materials.

EXAMPLES

A. Preparation of various polycarbonate solutions.

EXAMPLE 1

Preparation of polycarbonate from 2,2-bis-(3,5-dimethyl-4-hydroxyphenyl)-propane by the two-phase boundary process; alkaline mixture 568.8 g (2 mols) of 2,2-bis-(3,5-dimethyl-4-hydroxyphenyl)-propane[1]) and 5.6 g (0.06 mol) of phenol are dissolved in 858 ml of distilled water and 326 ml of 50% strength aqueous sodium hydroxide solution (6.2 mols of NaOH). After adding 448 ml of chlorobenzene, 1,490 ml of methylene chloride and 1.92 g (0.006 mol) of tetrabutylammonium bromide, 227.4 g (2.30 mols) of gaseous phosgene are passed into the mixture in the course of 60 minutes, while stirring. After adding 11.0 ml (0.08 mol) of triethylamine, the mixture is stirred for an additional 30 minute period. The resulting two-phase mixture is an emulsion which, even after standing for several hours, has not separated into the organic phase and the aqueous phase. The batch is diluted with an 80/20 by weight methylene chloride/chlorobenzene mixture (the same mixture as used in the reaction) in an amount such that the polycarbonate solution becomes 13% strength (about 20% strength after the reaction). The volume of the aqueous phase is further increased by adding distilled water in an amount such that the volume of the organic phase equals that of the aqueous phase. After adding the organic solvent and the water, the mixture is further stirred for a few minutes. An alkaline emulsified two-phase mixture is obtained.

(1)=94% strength by weight, prepared by the ion exchanger process from 97% strength by weight dimethylphenol and acetone and freed from byproducts only by distillation, and desorption of the reaction mixture, according to German patent applications Nos. P 2928443.3 (LeA 19,623) and P 29 28 464.8 (LeA 19,525), filed at the same time.

EXAMPLE 2

Polycarbonate batch as in Example 1; acid mixture

The polycarbonate batch is obtained as in Example 1. After the dilution with the organic solvent, the alkaline batch is acidified to a pH value of 2 or less by stirring with concentrated phosphoric acid and then, as in Example 1, diluted with distilled water in an amount such that the volume of the aqueous phase is the same as that of the organic phase. The mixture is further stirred for a few minutes. An acid emulsified two-phase mixture is obtained.

EXAMPLE 3

Preparation of polycarbonate from 2,2-bis-(3,5-dimethyl-4-hydroxyphenyl)-propane by the two-phase boundary process; acid organic phase separated off 568.8 g (2 mols) of 2,2-bis-(3,5-dimethyl-4-hydroxyphenyl)-propane and 5.6 g (0.06 mol) of phenol are dissolved in 2,286 ml of distilled water and 614.4 ml of 45% strength sodium hydroxide solution (10.22 mols of NaOH). After adding 1,490 ml of methylene chloride, 448 ml of chlorobenzene, 7.72 g (0.024 mol) of tetrabutylammonium bromide and 5.70 ml (0.024 mol) of tri-n-butylamine, 336.4 g (3.4 mols) of gaseous phosgene are passed into the mixture in the course of 60 minutes, while stirring. After passing in 250 g of the phosgene, a further 96 ml of 45% strength sodium hydroxide solution are added. After adding 5.6 ml (0.04 mol) of triethylamine, the mixture is stirred for 30 minutes. Thereafter, the two-phase mixture immediately separates sharply into the organic phase and the aqueous phase. The organic phase is separated off and is diluted with an 80/20 by weight methylene chloride/chlorobenzene mixture (as in the reaction) to a 13% strength polycarbonate solution (about 20% strength after the reaction), 2% strength aqueous phosphoric acid is added in the volume ratio of 2/1 and the mixture is stirred for several minutes. The aqueous acid phase is separated off from the organic phase in a continuously operating separator. The organic phase thus obtained is used for further experiments.

B. Working up of the polycarbonate solutions

EXAMPLES 4-8

Separation of alkaline two-phase mixtures (step 1 in the description)

After shaking vigorously, the alkaline two-phase mixture obtained according to Example 1 is separated off in a small laboratory centrifuge tube for five minutes at 5,000 revolutions/minute (Example 4, Table I). Similar alkaline two-phase mixtures but to which cationic additives have been added are also centrifuged, after vigorous shaking (Examples 5-8, Table I). After centrifuging, the organic phase which has been separated off and can still contain up to a few percent of water is located on the bottom of the small centrifuge tube, on top of it is a white creamy layer on which top is a clear or turbid aqueous layer. The smaller the thickness of the creamy layer, the greater is the ease of separation of the two-phase mixture. In the case of good separation, the aqueous phase is usually clear and the organic phase is usually still only slightly turbid. Table I shows that the cationic additives result in a considerable improvement of the alkaline separation. Positive results similar to those brought about by cationic additives are obtained if, instead of the additive, the mixture is subjected to shearing forces before being centrifuged (100 ml mixture, five seconds shearing with an Ultraturrax, type 45, Messrs. Jahnke and Kunkel, at 10,000 revolutions/minute).

TABLE 1

Separation of alkaline two-phase mixtures
(see Examples 4-8)
Cationic Additive

| Example No. | Substance | Amount, relative to the aqueous phase (ppm) | Height of the creamy layer[x] (mm) |
|---|---|---|---|
| 4 | None | 0 | 11 |
| 5 | a | 250 | 1 |
| 6 | b | 250 | 2 |
| 7 | c | 500 | 0 |
| 8 | d | 500 | <0.5 |

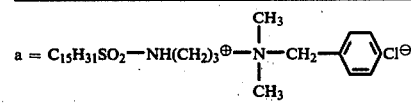

b = Mixture of methyldodecylbenzyltrimethylammonium chloride and dodecylxylene-bis-(trimethylammonium chloride)

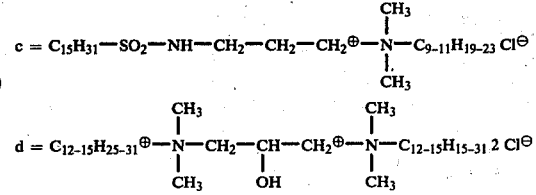

[x] Overall height of organic phase + creamy layer + aqueous phase = 100 mm.

EXAMPLES 9-13

Separation of acid two-phase mixtures (step 2 in the description)

After shaking vigorously, an acid two-phase mixture, such as is obtained according to Example 2, is centrifuged as described in Example 4 (Example 9, Table 2). An acid two-phase mixture is also centrifuged after shearing, as described in the text of Examples 4-8 and after the addition of cationic additives, as described in Examples 5-8. The results are shown in Table 2 (Examples 10-13) and their assessment is as described for Examples 5-8. It is found that both shearing and cationic additives result in considerable improvements in the separation of acid two-phase mixtures.

TABLE 2

Separation of acid two-phase mixtures
(see Examples 9-13)
Cationic Additive or Shearing

| Example No. | Substance | Amount, relative to the aqueous phase (ppm) | Height of the creamy layer[x] (mm) |
|---|---|---|---|
| 9 | None | 0 | 8 |
| 10 | None, but shearing | 0 | <0.5 |
| 11 | e | 250 | <0.5 |
| 12 | f | 250 | 0 |

TABLE 2-continued

Separation of acid two-phase mixtures
(see Examples 9-13)
Cationic Additive or Shearing

| Example No. | Substance | Amount, relative to the aqueous phase (ppm) | Height of the creamy layer[(x)] (mm) |
|---|---|---|---|
| 13 | g | 250 | 0 | e = benzyldodecyldimethylammonium chloride

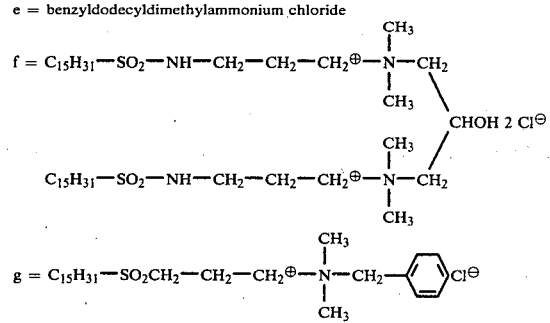

$$g = C_{15}H_{31}-SO_2CH_2-CH_2-CH_2^{\oplus}-\underset{\underset{CH_3}{|}}{\overset{\overset{CH_3}{|}}{N}}-CH_2-\hspace{-2pt}\left\langle\rule{0pt}{8pt}\right\rangle\hspace{-2pt}Cl^{\ominus}$$

[(x)]see Table 1

EXAMPLES 14-26

Washing the organic phase, separated off after acidification, with water (step 3 in the description)

Distilled water is added (in a volume ratio of 1/1) to an organic phase separated off after the acidification such as is obtained in Example 3. 100 g of this mixture are subjected to shearing by an Ultraturrax for 30 seconds as described in the text of Examples 5-8. Washing of the organic phase is judged to be good if, after the Ultraturrax treatment, the mixture immediately separates spontaneously into two phases which can be turbed to a greater or lesser extent. It is judged to be poor if a complete emulsion is obtained which does not separate immediately by itself into two phases. Examples 14-24 (see Table 3) show that an improved phase separation during washing with water is achieved with anionic additives.

Examples 25 and 26, in which the organic phase from the experiment according to Example 11 was used (organic phase of Example 11 after acidifying in the presence of a cationic compound and separating off the acid in the centrifuge) show that a significant improvement can also be achieved by anionic compounds during the washing with water when the preceding separation of the acid two-phase mixture has been carried out in the presence of cationic compounds.

TABLE 3

Washing the organic phase, separated off after acidification, with water
Anionic additive

| Example No. | Substance | Amount, relative to to aqueous phase (ppm) | Separation of the phases after emulsifying |
|---|---|---|---|
| 14 | — | 0 | no |
| 15 | h | 10 | yes |
| 16 | i | 2.5 | yes |
| 17 | j | 5 | yes |
| 18 | k | 10 | yes |
| 19 | l | 10 | yes |
| 20 | m | 50 | yes |
| 21 | n | 50 | yes |
| 22 | o | 50 | yes |
| 23 | p | 75 | yes |
| 24 | q | 5 | yes |

TABLE 3-continued

Washing the organic phase, separated off after acidification, with water
Anionic additive

| Example No. | Substance | Amount, relative to to aqueous phase (ppm) | Separation of the phases after emulsifying |
|---|---|---|---|
| 25 | j | 75 | yes |
| 26 | — | 0 | no | h = polystyrene-sulphonic acid
i = polyvinyl sulphate, K salt
j = polystyrene-sulphonic acid, Na salt
k = lignin-sulphonate
l = alginate
m = carboxymethylcellulose, Na salt
n = 2-ethylhexylpolyphosphoric acid ester-anhydride, K salt
o = condensed naphthalenesulphonate, Na salt
p = alkylsulphonate, Na salt
q = cellulose sulphate, Na salt

RE EXAMPLES 4-26

The results which were obtained in discontinuously operating centrifuges (see Examples 4-26) can be reproduced in continuously operating centrifuges such as separators.

Although the invention has been described with respect to specific materials and specific processes, it is only to be limited as far as is set forth in the accompanying claims. What is claimed is:

1. In the process for working up two-phase mixtures which are obtained in the course of the synthesis of polycarbonates by the two-phase boundary process, the improvement comprising one or more of the steps of
   (i) promoting the separation of the acidic two-phase mixture resulting from the acidification of the organic phase obtained by separation from alkaline two-phase mixture into an organic phase and an aqueous phase by the addition of one or more cationic emulsifying agents and/or dispersing agents and, optionally, by the application of shear energy; and,
   (ii) promoting the separation of the two-phase mixture resulting from water washing of the organic phase obtained by separation of the acidic two-phase mixture by adding one or more water-soluble organic anionic compounds to the wash water.

2. The process according to claim 1, characterized in that the cationic emulsifying agents and dispersing agents are employed in amounts of 10 to 10,000 ppm, relative to the weight of the aqueous phase of the two-phase mixture.

3. The process according to claim 1, characterized in that the cationic emulsifying agents and dispersing agents are employed in amounts of 100 to 1,000 ppm, relative to the weight of the aqueous phase of the two-phase mixture.

4. The process according to claim 1, characterized in that the water-soluble, organic anionic compounds are employed in amounts of 0.1 to 1,000 ppm, relative to the weight of the aqueous phase of the two-phase mixture.

5. The process according to claim 1, characterized in that the water-soluble organic, anionic compounds are employed in amounts of 5 to 100 ppm, relative to the weight of the aqueous phase of the two-phase mixture.

6. In the process for working up two-phase mixtures which are obtained in the course of the synthesis of polycarbonates characterized in that they contain at least 50% by weight units derived from 2,2-bis-(3,5-dimethyl-4-hydroxyphenyl)-propane, by the two-phase boundary process, the improvement in promoting the separation of the alkaline two-phase mixture, obtained upon completion of the synthesis reaction, into an organic phase and an aqueous phase consisting essentially of the addition of one or more cationic emulsifying agents and/or dispersing agents and optionally by the application of shearing energy.

7. In the process for working up two-phase mixtures which are obtained in the course of the synthesis of polycarbonates by the two-phase boundary process wherein the alkaline two-phase mixture is separated into an organic phase and an aqueous phase, and said organic phase having then been acidified by aqueous acid, the improvement comprising promoting the separation of said acidic two-phase mixture into an organic phase and an aqueous phase by the addition of one or more cationic emulsifying agents and/or dispersing agents and optionally by the application of shearing energy.

8. In the process for working up two-phase mixtures which are obtained in the course of the synthesis of polycarbonates by the two-phase boundary process wherein the alkaline two-phase mixture is separated into an organic phase and an aqueous phase and said organic phase is acidified and separated into a second organic phase and an aqueous phase, said second organic phase having then been washed with water, the improvement comprising promoting the separation of the two-phase mixture of said second organic phase and wash water by adding one or more water-soluble organic anionic compounds to said wash water.

* * * * *